Feb. 10, 1953 F. FENTON 2,627,892
METHOD OF MAKING PLAY BALLS
Filed March 13, 1947 2 SHEETS—SHEET 1
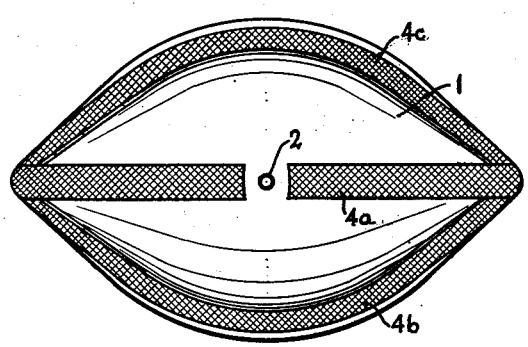
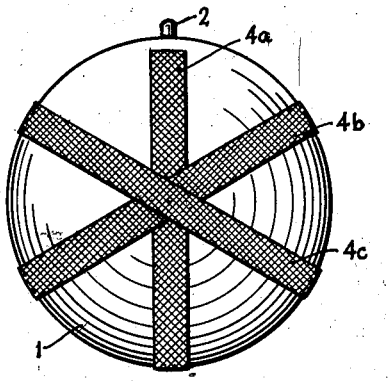
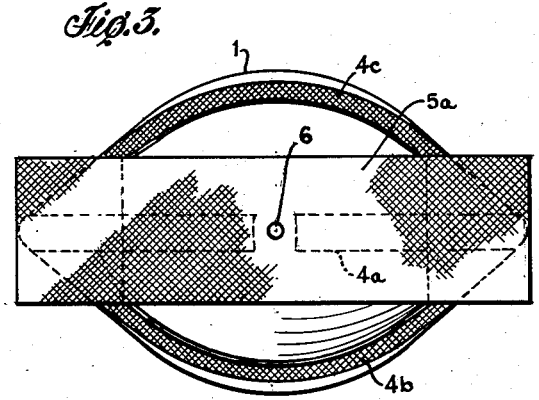
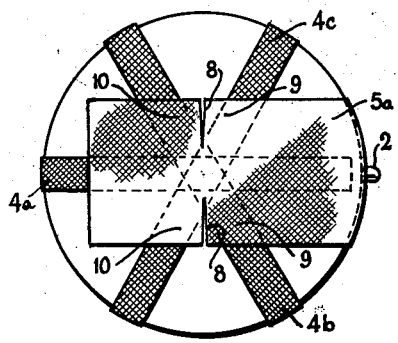
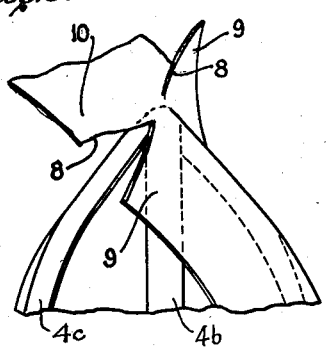
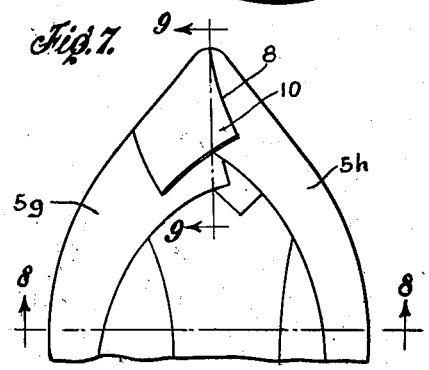
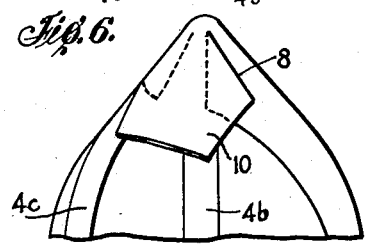
INVENTOR
FRANK FENTON
BY
ATTORNEYS Feb. 10, 1953 F. FENTON 2,627,892
METHOD OF MAKING PLAY BALLS
Filed March 13, 1947 2 SHEETS—SHEET 2
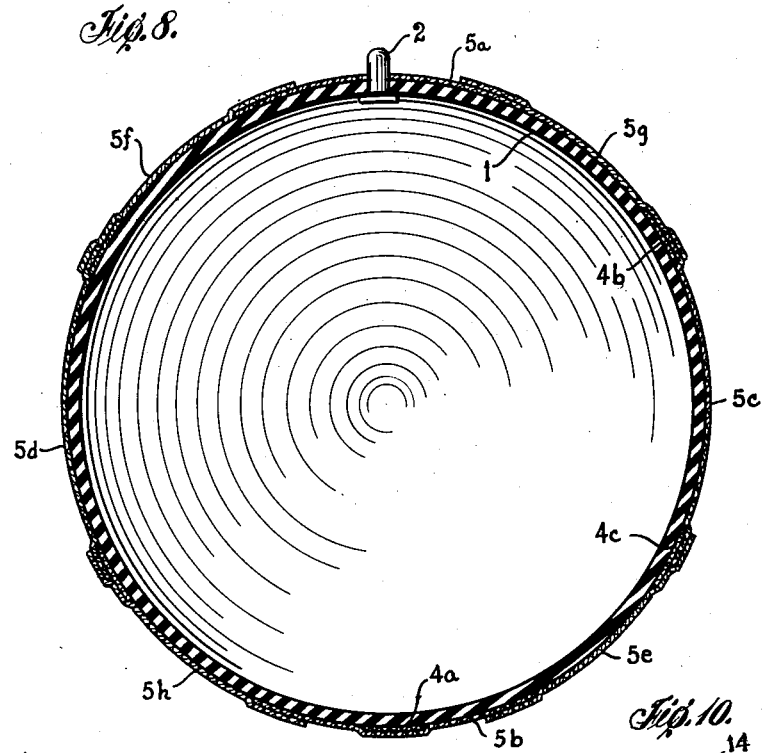
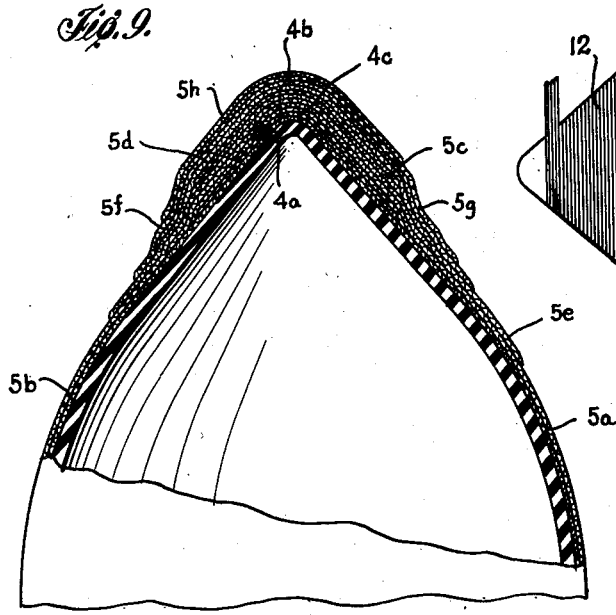
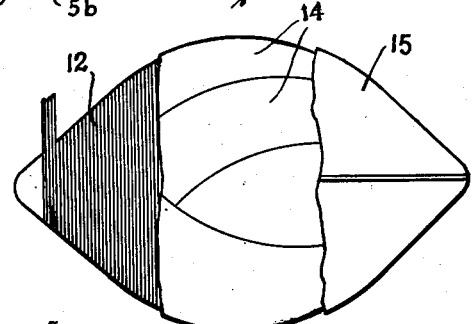
INVENTOR
FRANK FENTON
BY
ATTORNEYS Patented Feb. 10, 1953

2,627,892

UNITED STATES PATENT OFFICE 2,627,892

METHOD OF MAKING PLAY BALLS

Frank Fenton, Akron, Ohio, assignor to The Sun Rubber Company, Barberton, Ohio, a corporation of Ohio Application March 13, 1947, Serial No. 734,484

14 Claims. (Cl. 154—16)

The present invention relates to a new and improved method of making inflated balls of rubber and fabric. While the invention is capable of use in this general field, it is especially designed and intended to be employed in the manufacture of footballs and will be described in connection with the manufacture of a ball of this type.

Footballs of the type described and shown herein are made of an inner rubber bladder provided with an inflation valve. Over the bladder are laid a plurality of layers of rubberized fabric and an intermediate layer of relatively heavy cord which is wrapped about the partially finished ball. The ball is then covered with a layer of rubber to form the outer cover and the ball is given a final cure in a mold under internal pressure.

The layers of fabric and cord are for the purpose of giving stability to the ball and preventing its growth from the internal pressure. It is also desirable, particularly in footballs, to provide an extra reinforcement for the poles of the ball.

The fabric which is used for covering the bladder is usually a square woven, frictioned fabric. In former generally accepted methods, this fabric has been cut into a plurality of oval segments, known as "orange peel" segments, which are applied over the bladder with their edges overlapping and with the points of the segments all meeting at the poles. To reinforce the poles, it has been the practice to apply additional caps made of superimposed circular fabric disks of graduated sizes over the poles. Usually two layers of "orange peel" segments are employed and between these layers is located a spiral winding of heavy cord which holds the ball to its proper shape and size.

The use of the "orange peel" segments has many objections, the major one of which is the high percentage of waste fabric which is created when the segments are died out of sheets of frictioned fabric. It is impossible to cut the fabric into these oval segments without losing as high as over 40% of the fabric, and while some of the fabric is recovered in making up the polar caps, the waste is extremely high.

In addition to this waste, the making and application of the separate caps constitute a substantial addition to the cost of manufacture.

It is the object of the present invention to perfect a method of manufacturing balls, and particularly footballs of the type specified, by employing strips of frictioned fabric which are to replace the old "orange peel" segments. These strips are preferably rectangular, although exact rectangularity is not required. One of the principal advantages of this practice is the saving of material as it is possible to obtain a greater area of fabric which is usefully employed for covering the ball by cutting the material in strip form rather than in oval segments. The fabric is cut on the bias, usually at 45°, so that it may be shaped and formed about the curved surface of the ball without wrinkling, and while this necessarily creates some waste, the actual waste is reduced by about 50% over the old segment method.

In addition to the above factor of saving, the strips are so laid over the ball that separate reinforcing polar caps are no longer employed. This is because the strips are cut and applied to the ball along the long axis of the ball with both ends of every strip extending across the poles. By slitting the strips transversely at the poles, the operator may tuck the ends of the strip about the poles, overlapping the wings formed by the slitting operation, and as all of the strips meet at the poles, this operation builds up a heavy fabric reinforcement which is superior to the disk-like caps employed in the segment method.

A sufficient number of strips are employed in each covering operation so that when a full complement of strips is laid over the ball, the entire surface of the ball will be covered, with a slight overlapping of the edges of the strips at the central or equatorial zone of the ball, the degree of overlapping of the strips gradually increasing toward the poles. This gives an evenly graduated increase in reinforcement as the poles are approached where the maximum reinforcement is required and gives a better balanced ball.

In the drawings and in the description which is to follow, the best known and preferred form of the invention is disclosed. It will be understood, however, that many of the details set forth may be varied or modified without in any way sacrificing the benefits of the invention or departing from the scope thereof as set forth in the appended claims. It will also be apparent that while the improvement in ball manufacture has been particularly designed and intended for the manufacture of ellipsoidal balls, such as Rugby footballs, the principles may be employed in the making of spherical balls, such as basketballs, soccer balls, playground balls and the like.

In the drawings:

Fig. 1 is a side elevation of a standard football bladder after the first actual building operation following the making of the bladder.

Fig. 2 is an end view of the ball of Fig. 1.

Fig. 3 is a side view showing the manner of applying the first strip of frictioned bias fabric.

Fig. 4 is an end view of Fig. 3.

Fig. 5 is a view showing the first step in smoothing and applying the fabric over one of the poles.

Fig. 6 is a view showing the fabric fully applied over the pole.

Fig. 7 is a side view of one end of the ball after the application of all of the strips which constitute the first reinforcing layer or jacket.

Fig. 8 is an enlarged section through the widest part or equator of the ball in the condition shown in Fig. 7. This section is indicated by the line 8—8 of Fig. 7.

Fig. 9 is a section through a pole of the ball on the line 9—9 of Fig. 7, this view being enlarged to show the manner in which the poles are reinforced.

Fig. 10 is a composite view showing the succeeding operations, the several additional layers being stepped back to show the construction.

In the method which has been perfected, the rubber center or bladder which forms the interior air container is made up in the manner known in the art of a number of rubber segments joined together to form the usual ellipsoidal center or core. This is provided with a standard valve for inflating purposes and is given a preliminary cure under pressure in a mold. Such a center or bladder is indicated at 1 and the valve at 2.

After the bladder is cured, it is rounded out with a light pressure sufficient to cause it to take and hold the proper shape as to constitute a form on which the ball is built and to present a sufficiently solid foundation so that the next succeeding operations may be performed. Usually an internal air pressure of approximately 8 ounces is sufficient. The bladder is then coated with an adhesive rubber cement which will cause the adjacent covering layers to adhere thereto.

A number of narrow, friction-coated fabric tapes are then applied about the bladder, each tape extending around the poles. It is customary to apply the first tape 4ª starting at the valve stem, extending across both poles and terminating at the valve stem. In the form shown, two additional tapes extending about the entire bladder parallel to the long axis of the bladder are then applied approximately 60° apart to the bladder. These tapes are indicated as 4ᵇ and 4ᶜ. The primary purpose of these tapes 4ª to 4ᶜ is to hold the bladder at the correct size during the subsequent operations. The temperature of the room in which the subsequent operations are performed may vary sufficiently to cause the bladder to expand or contract or the warmth of the operator's hands may cause an expansion of the bladder were it not for the restrictive property of these tapes. It is also advisable to increase the pressure in the bladder slightly before the next operations so that a more solid form will be afforded and the tapes prevent any expansion of the bladder beyond the exact size for the finished ball.

As shown in Fig. 2, the several tapes overlie one another at the poles, forming three thicknesses of fabric at each of these points. This constitutes the first reinforcement for the poles of the ball.

After the taping operation, the bladder is inflated to about 1 lb. pressure, the increase in pressure causing the pointed ends or poles to draw in slightly. The bladder is now gauged for exact size and shape.

The next series of steps is the application of the first fabric reinforcement which is to take the place of the "orange peel" segments and also of the supplementary caps.

For this purpose it is preferred to use a closely woven fabric such as a standard light Osnaburg. This fabric is coated on both sides with an adhesive, unvulcanized rubber coating applied either by calendering or spreading, the former preferred. The fabric is cut into strips as indicated above. It is preferred to cut the fabric on the bias, in order that it may subsequently be shaped more easily about the bladder, but this is not essential and straight cut fabric or tapes may be used. The strips are of a length so that each strip when laid over the bladder parallel to the longitudinal axis will extend beyond each pole for a substantial distance, preferably about two inches. The strips are of a width which can be conveniently handled and so that the selected number of strips will cover the bladder at its largest circumference with some overlap at that area. Without in any way intending to limit the invention to exact dimensions, it has been found that eight strips each 3¼" wide and 16½" long will reach from pole to pole with a substantial excess on either end and will adequately cover the ball at the equator.

Preferably the first strip which is applied and which is indicated at 5ª is provided with a centrally located hole 6 and this strip is applied over the valve stem as shown in Fig. 3. The operator applies this strip to the bladder, shaping it and smoothly applying it to the sticky surface of the bladder and to the exposed underlying surface of the tape 4ª. Usually this shaping may be easily done in the central zone of the strip by stroking the fabric with the flat edge of a shear blade. The shaping and smoothing operation is carried up to a point approaching the poles.

The operator then slits the fabric strip transversely at a line coincident with each pole as shown at 8, 8 in Fig. 4. She may then shape and smooth each wing 9 on the peak of the ball, and when this is done the extreme ends of the strips may be attached to the ball beyond the pole and the wings 10 brought over and applied on the wings 9. The smoothing and shaping are again done with the flat edge of the shear blade. In this manner the first strip is smoothly applied over the ball and over the areas around both poles. This method of taking up the fullness in the fabric forms dart-shaped laminated or doubled areas in the edges of each strip of fabric at the poles.

The remaining seven strips of the complement of eight strips which comprise the first fabric reinforcing jacket are the same as strip 5ª except that no valve hole is provided. They are applied in the same manner as the strip 5ª, being slit transversely and shaped and smoothed over the polar areas as in the first instance.

It is the preferred practice to apply the second strip 5ᵇ opposite to or at 180° from the strip 5ª, to apply the third and fourth strips 5ᶜ and 5ᵈ at 90° from the first two strips, and then to apply the strips 5ᵉ to 5ʰ at intermediate points. As shown in Fig. 8, this will completely cover the ball at the equator with a sufficient overlap between the several strips. As the diameter of the ball decreases toward the poles, the extent of these overlaps will progressively increase. As the polar areas are reached, the number of plies will increase due to the fact that each strip extends across both poles and also due to the overlapping of the wings 9 and 10 of each strip. At the extreme peak on each pole, the tapes 4 will add three thicknesses of fabric.

It will be seen that a very substantial thickness of fabric is built up at the poles concurrently with the application of the strips, and due to the progressively increasing areas of overlapping as the strips approach the poles, the reinforcement will gradually increase so that abrupt step-offs are avoided.

After the first layer of reinforcing strips are applied in the manner designated, the ball is coated with rubber cement and is then put in a lathe or winding machine by which a layer of cord is wrapped spirally about the ball. This reinforcing cord layer may vary as desired, but it has been found that a single layer of four cords wrapped in spiral about the ball under a light tension, sufficient to insure that the cords have no slack therein, is satisfactory for the purpose. The cords which have been used are approximately the size of ordinary tire cords and are usually tightly twisted so they have a minimum stretch under the pressure and blows to which the ball is subjected. Such cords are designated in Fig. 10 of the drawings at 12.

After the cord layer is applied, the surface of the ball is cemented and a second and outer jacket of fabric reinforcing strips is applied about the entire surface of the ball and over the poles. Such reinforcing strips are designated at 14, 14 in Fig. 10 and are applied and shaped about the ball in the same manner that the strips 5 were applied.

The ball is then covered with the outermost layer. Preferably this is a rubber stock compounded to withstand the wear and abrasion to which the ball may be subjected. Such a layer is indicated at 15. It may be laid over the ball in a number of sector-shaped segments.

The ball is now ready to be placed in a heated mold in which it is held under internal pressure until the rubber in the cover stock 15 and throughout the ball is completely vulcanized. In the process of vulcanization, a mold may be used which is slightly larger than the outside of the uncured ball, but this is mainly for the purpose of properly seating the uncured ball in the mold and such expansion as may be obtained during vulcanization is incidental.

It will be seen that not only has the method of making composite rubber and fabric balls been greatly simplified, but a substantial saving in fabric has resulted. The operation of applying separate caps has been dispensed with and other economies have been effected.

Also the construction of the finished ball is quite different from balls made by the old sector-segment method. The new ball is much better in many ways than balls made by the earlier methods for the reasons which have been stated. One of the reasons why the ball is better is the graduated reinforcement of the ball from the central zone toward the poles and the concentration of a multiplicity of layers of fabric at the poles gives a better reinforcement at these points. The number of layers constituting the reinforcement at the poles will be approximately double the number shown in Fig. 9. In this view there has been no attempt to show additional thickness which may be due to the areas of overlap of the wings 9 and 10 of each strip. The ball exhibits no objectionable tendency to grow during use.

These and other advantages will be found to be achieved by the improved method of building and by the improved features of ball construction. In adapting this method to the making of spherical balls, obvious modifications will be made. The intermediate cord wrapping may be omitted in certain types of balls, and it is also possible to make the ball on a removable core if desired. Although it is preferred to incorporate the internal bladder as an integral part of the finished ball, this is not essential. The invention may also be applied to non-inflatable balls.

What is claimed is:

1. The method of making a ball of rubber and fabric, comprising providing an internal form about which the ball is built, laying a plurality of strips of rubberized fabric over the form with the ends of each strip extending across a pole, slitting the strips transversely at the pole, and smoothing and shaping the wings formed by the slitting operation in overlapping relation at the polar area.

2. The method of making a ball of rubber and fabric, comprising providing an internal form about which the ball is built, laying a plurality of rectangular strips of rubberized fabric over the form in spaced angular relation so that the strips will cover the form at the equator, the ends of each strip extending across the poles of the form, slitting the strips transversely at the poles, and smoothing and shaping the wings formed by the slitting operation in doubled relation at the polar areas.

3. The method of making a ball of rubber and fabric, providing an internal form about which the ball is built and covering said form with a jacket of rubberized fabric having reinforced areas at the poles, said jacket being composed of a plurality of strips of fabric, the ends of each strip extending across the poles of the form, and shaping and doubling the fabric of each strip in overlapping relation at the polar areas.

4. The method of making a ball of rubber and fabric, providing an internal form about which the ball is built and covering said form with a jacket of rubberized fabric having reinforced areas at the poles, said jacket being composed of a plurality of strips of fabric, the ends of each strip extending across the poles of the form, and shaping and doubling the fabric of each strip in overlapping relation at the polar areas, the strips being distributed around the form so that the form is completely covered at the equator.

5. The method of making a ball of rubber and fabric, providing an internal form about which the ball is built and covering said form with a jacket of rubberized fabric having reinforced areas at the poles, said jacket being composed of a plurality of strips of fabric, the ends of each strip extending across the poles of the form, and shaping and doubling the fabric of each strip in overlapping relation at the polar areas, the strips being distributed around the form so that the form is completely covered at the equator with an overlapping of the edges of the strips.

6. The method of making a ball of rubber and fabric, providing an internal form about which the ball is built and covering said form with a jacket of rubberized fabric having reinforced areas at the poles, said jacket being composed of a plurality of strips of fabric, the ends of each strip extending across the poles of the form, and shaping and doubling the fabric of each strip in overlapping relation at the polar areas, the strips being arranged around the form with the edges of adjacent strips overlapping, the extent of each overlap increasing gradually from the equator to the poles.

7. The method of making a ball of rubber and fabric which comprises providing an internal form, covering said form with a jacket of rubberized fabric which is progressively reinforced from the equator to the poles, said jacket being composed of a plurality of substantially rectangular strips of bias fabric, an end of each strip extending beyond a pole of the form, shaping the strip at the polar areas by overlapping portions of the strip, and smoothing said overlapped areas on the form, the said strips being arranged around the form so that the form is completely covered thereby with the edges of adjacent strips overlapping.

8. The method of making a ball of rubber and fabric which comprises providing an internal form, covering said form with a jacket of rubberized fabric which is progressively reinforced from the equator to the poles, said jacket being composed of a plurality of substantially rectangular strips of bias fabric, an end of each strip extending beyond a pole of the form, shaping the strip at the polar areas by overlapping portions of the strip, and smoothing said overlapped areas on the form, the said strips being arranged around the form so that the form is completely covered thereby with the edges of adjacent strips overlapping, the extent of each overlap along the edges of the strips increasing gradually from the equator to the poles.

9. The method of making a ball of rubber and fabric, comprising providing an internal form having two opposite poles, and laying over said form a plurality of substantially rectangular strips with an end of each strip extending across a pole, spacing said strips about the form so that all of the form is covered at the equator and all of the strips are superposed at said poles to form polar areas which are reinforced by a multiplicity of superposed strips.

10. The method of making a ball of rubber and fabric, comprising providing an internal form having two opposite poles, and laying over said form a plurality of substantially rectangular strips with the ends of each strip extending across both poles, spacing said strips about the form so that all of the form is covered at the equator and all of the strips are superposed at said poles to form reinforced polar areas.

11. The method of making a ball of rubber and fabric, comprising providing an internal form, laying over said form a plurality of substantially rectangular strips with an end of each strip extending across a pole, spacing said strips about the form so that all of the form is covered at the equator and all of the strips are superposed at the poles to form reinforced polar areas, and cutting and shaping the end of each strip as it is applied to the form so that it is doubled at the polar areas.

12. The method of making a ball of rubber and fabric, comprising providing an internal form, laying over said form a plurality of substantially rectangular strips with the ends of each strip extending across both poles, spacing said strips about the form so that all of the form is covered at the equator and all of the strips are superposed at the poles to form reinforced polar areas, and cutting and shaping the end of each strip as it is applied to the form so that it is doubled at the polar areas.

13. The method of making an inflated ellipsoidal ball comprising the steps of making an inflatable rubber bladder, inflating the bladder, applying a plurality of fabric tapes around the ball and crossing at the poles, overlaying the bladder with a plurality of strips of bias cut rubberized fabric, said strips extending across the poles and with their longitudinal edges overlapping, and doubling and smoothing those portions of each of the strips to form dart-shaped laminated areas which are located in the polar areas.

14. The process set forth in claim 13 in which a reinforcing layer of spirally wound cord is applied over the strips, then applying a second layer of strips in the same manner, laying a cover of vulcanizable rubber over the second layer of strips, and then vulcanizing the ball under internal pressure.

FRANK FENTON.

REFERENCES CITED

The following references are of record in the file of this patent:

UNITED STATES PATENTS

| Number | Name | Date |
|---|---|---|
| 2,061,604 | Winterbauer | Nov. 24, 1936 |
| 2,221,533 | Voit et al. | Nov. 12, 1940 |
| 2,302,985 | Voit et al. | Nov. 24, 1942 |
| 2,380,370 | Smith, Jr. | July 10, 1945 |